(12) United States Patent
Patil et al.

(10) Patent No.: US 10,135,750 B1
(45) Date of Patent: Nov. 20, 2018

(54) SATISFACTION-RATIO BASED SERVER CONGESTION CONTROL MECHANISM

(71) Applicant: EMC Corporation, Hopkinton, MA (US)

(72) Inventors: Mahesh Sidappa Patil, Saratoga, CA (US); Shufeng Huang, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 986 days.

(21) Appl. No.: 14/510,363

(22) Filed: Oct. 9, 2014

(51) Int. Cl.
*H04L 12/911* (2013.01)
*H04L 29/08* (2006.01)

(52) U.S. Cl.
CPC .......... *H04L 47/70* (2013.01); *H04L 67/1097* (2013.01)

(58) Field of Classification Search
CPC ................ H04L 47/70; H04L 67/1097; H04L 29/08549; H04L 67/1095; G06F 3/0601; G06F 11/2056; G06F 17/30575; G06F 17/302; G06F 2212/261; G06F 2212/263
See application file for complete search history.

(56) References Cited

U.S. PATENT DOCUMENTS

| | | | | |
|---|---|---|---|---|
| 6,028,860 A | * | 2/2000 | Laubach | H04Q 11/0478 370/395.64 |
| 6,925,561 B1 | * | 8/2005 | Hunt | H04W 74/0866 370/312 |
| 8,929,319 B2 | * | 1/2015 | Anderson | H04W 72/1284 370/329 |
| 2002/0194251 A1 | * | 12/2002 | Richter | G06F 9/4825 718/103 |
| 2007/0105573 A1 | * | 5/2007 | Gupta | H04W 72/0406 455/509 |
| 2009/0274041 A1 | * | 11/2009 | Chou | H04J 3/0682 370/216 |
| 2009/0296641 A1 | * | 12/2009 | Bienas | H04W 24/02 370/329 |
| 2010/0014423 A1 | * | 1/2010 | Furuskar | H04W 74/02 370/235 |
| 2010/0080145 A1 | * | 4/2010 | Frietsch | H04L 41/0896 370/254 |
| 2010/0162318 A1 | * | 6/2010 | Smith | H04N 21/4331 725/50 |

(Continued)

OTHER PUBLICATIONS

"Priority queue", *Wikipedia*, retrieved Oct. 7, 2014, (Sep. 26, 2014), 6 pages.

(Continued)

*Primary Examiner* — Arvin Eskandarnia
*Assistant Examiner* — Javier O Guzman
(74) *Attorney, Agent, or Firm* — Womble Bond Dickinson (US) LLP (57) ABSTRACT

Exemplary methods include performed by a storage system client include sending a service request to a storage system server. The methods further include in response to receiving a response from the storage system server requesting the storage system client to perform a backoff dynamically calculating a satisfaction ratio (s-ratio), determining a backoff time based on the s-ratio, and waiting for the backoff time to expire. In one embodiment, the methods further include in response to determining the backoff time has expired, resending the service request to the storage system server.

21 Claims, 5 Drawing Sheets

(56) References Cited

U.S. PATENT DOCUMENTS

| | | | | |
|---|---|---|---|---|
| 2010/0169486 A1* | 7/2010 | McCormack | H04L 12/5695 | 709/226 |
| 2010/0332610 A1* | 12/2010 | Cherian | H04W 72/10 | 709/207 |
| 2011/0113134 A1* | 5/2011 | Bello | H04L 63/1458 | 709/224 |
| 2012/0263036 A1* | 10/2012 | Barclay | H04W 28/0247 | 370/230 |
| 2012/0275305 A1* | 11/2012 | Lin | H04W 74/0841 | 370/235 |
| 2013/0148589 A1* | 6/2013 | Smith | H04W 74/002 | 370/329 |
| 2013/0166747 A1* | 6/2013 | Lam | H04L 67/1097 | 709/225 |
| 2013/0239156 A1* | 9/2013 | Ha | H04N 21/234 | 725/100 |
| 2014/0324973 A1* | 10/2014 | Goel | H04L 12/2803 | 709/204 |
| 2015/0304999 A1* | 10/2015 | Rune | H04W 4/70 | 370/329 |
| 2015/0365476 A1* | 12/2015 | Genevski | H04L 67/1095 | 709/201 |
| 2016/0212060 A1* | 7/2016 | Holcombe | H04W 4/001 | |

OTHER PUBLICATIONS

"Queueing theory", *Wikipedia*, retrieved Oct. 7, 2014, (Sep. 11, 2014), 7 pages.

"Token bucket", *Wikipedia*, retrieved Oct. 7, 2014, (Sep. 22, 2014), 4 pages.

Allman, "TCP Congestion Control;" RFC 2581; http://www.ietf.org/rfc/rfc2581.txt, (Apr. 1999), 14 pages.

* cited by examiner

SATISFACTION-RATIO BASED SERVER CONGESTION CONTROL MECHANISM

FIELD

Embodiments of the present invention relate generally to data storage systems. More particularly, embodiments of the invention relate to fair distribution of resources.

BACKGROUND

The "many-to-one" topology deployment is very common in the field of data backup/replication. For example, big companies typically deploy a replication/backup client at each of their local branches for fast local recovery. To provide disaster recovery capability, a centralized replication/backup server is often deployed at the replication/backup site for all the backup/replication clients at the local branches. In such a topology, the replication/backup clients at the multiple local branches replicate/backup to a single centralized replication/backup server. Since different local branches have different workloads during different time periods, the replication/backup server may experience varying amounts of service requests from each replication/backup client. Moreover, it is possible that additional replication/backup clients may be introduced in the future, which further complicates the dynamics of service requests to the replication/backup server.

Conventional methods for handling large amount of service requests are either static or not designed to deal with storage systems. For example, queuing mechanisms are typically used to deal with the case when the number of service requests (temporarily) exceeds the capability of the server. However, existing queuing mechanisms are all static. Users predefine the rules which statically determine the mapping of service requests to different priority queues, the service requests are then executed in the order based on their priorities. Those static rules are not adequate to address the dynamic nature of the clients whose demands change over time. Moreover, maintaining a queue also consumes resources (e.g., memory) and the size of a queue is limited by its pre-defined length. Token bucket is another often used approach to rate-limit the service requests sent by a client. Similar to a queue, a token bucket also falls in to the "static" category where the generating rate of tokens is pre-defined. The Transmission Control Protocol (TCP) provides a dynamic mechanism for managing transmission rate by controlling the size of a congestion window. However, it is designed to deal with network congestions. Thus, there is a need for a mechanism to dynamically manage resources on a server such that all clients are equally satisfied based on their needs.

BRIEF DESCRIPTION OF THE DRAWINGS

Embodiments of the invention are illustrated by way of example and not limitation in the figures of the accompanying drawings in which like references indicate similar elements.

DESCRIPTION OF EMBODIMENTS

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

References in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Techniques for distributing resources fairly among the storage system clients are described herein. According to one embodiment, a server such as a storage system server (herein referred to as a "server") is communicatively coupled to a plurality of clients such as storage system clients (herein referred to as "clients"). In one embodiment, each client includes a satisfaction ratio (herein referred to as s-ratio) calculator for determining its s-ratio. As used herein, an "s-ratio" refers to the ratio of the amount of resources that the client has been granted and the amount of resources that the client needs. Thus, the s-ratio is a percentage number that measures how "satisfied" the client is currently, and reflects the current needs of the client. For example, the more "satisfied" the client, the more resources the client has towards the amount of resources it needs.

In one embodiment, the server sends the backoff rules to all the clients, and each client stores the backoff rules (e.g., as a data structure) in a storage device accessible by the client. The backoff rules include, but are not limited to, predetermined backoff times for each corresponding predetermined s-ratio range. Thus, a client's s-ratio can be used to index the backoff rules to retrieve a backoff time for performing backoff. In one embodiment, the server configures the backoff times such that the more satisfied the client (i.e., the higher the s-ratio), the longer the backoff time will be, thus allowing less satisfied clients a higher probability of acquiring the resources from the server.

According to one embodiment, in response to receiving a service request from a client, the server determines whether there are available resources to accommodate the requested service. As used herein, a "service" can be any type of service that requires resources to be allocated, including, for example, a backup, replication, migration, etc. As used herein, "resources" refer to any software and/or hardware resources required to perform the requested service, including, for example, streams, network bandwidth, etc. As used herein, a "stream" refers to a collection of resources that are required to perform a backup, replication, or migration process. The resources may include software and/or hardware (e.g., processor core, memory, threads).

In one embodiment, in response to determining there are available resources or the remaining resources are above a predetermined threshold, the server grants the requested service. In one embodiment, in response to determining the resources are not available (e.g., the amount of available resources is less than or equal to a predetermined threshold), the server denies the request by sending a denial message (e.g., a remote procedure call (RPC) message) to the requesting client. In one embodiment, the server includes information in the denial message requesting the denied client to perform a backoff. As used herein, a "backoff" refers a mechanism that is used to rate-limit the service requests sent by a client to the server and to ensure that all clients are equally satisfied. Simply put, backoff refers to a process where the client waits or suspends for a predetermined amount of time (i.e., backoff time) before sending or retrying another service request. As a result, the backoff mechanism drastically reduces the amount of service requests received by the server and, thus, prevents the server from being overwhelmed by service requests that it cannot accommodate due to a lack of resources.

In one embodiment, each client includes a backoff time calculator for calculating a backoff time in response to receiving a backoff request from the server. In one embodiment, the backoff time calculator uses the current s-ratio to lookup its backoff rules to determine the backoff time. According to one embodiment, the client then performs the backoff using the determined backoff time. Once the backoff is completed (i.e., the backoff time has expired/elapsed), the client resends it service request.

According to one embodiment, the server is configured to request certain clients to relinquish resources (e.g., by terminating one or more services) when the amount of available resources is below a predetermined threshold. In one such embodiment, the clients are expected to include their s-ratios as part of the service requests. Alternatively, the clients may periodically send their respective satisfaction information to the server to be stored therein. In one embodiment, in response to receiving a service request, the server determines whether the requesting client is "starved" of resources. In one embodiment, the server determines that the client is starved if its s-ratio is below a predetermined s-ratio threshold (herein referred to as the "starved s-ratio"). In response to determining the client is starved, the server sets a predetermined bit to a predetermined value indicating there is at least one client that is starved of resources.

Subsequently, in response to receiving another service request, the server determines whether: 1) there is at least one starved client, 2) the requesting client reported an s-ratio that is higher than a predetermined s-ratio threshold (herein referred to as the "rich s-ratio"), and 3) the amount of available resources required to perform the requested service is below a predetermined resource threshold. In response to determining all three conditions are met, the server sends a request to the client requesting it to relinquish some resources. Here, the request to relinquish resources can be included in the same denial message that is sent to the client, or a different message.

In response to receiving the request to relinquish resources, the client relinquishes a predetermined amount of resources, for example, by terminating a predetermined number of services. According to one embodiment, in response to determining that a service request has not been received from a starved client in a predetermined time period (e.g., the last 5 minutes), the server resets the predetermined bit to a predetermined value indicating there are no starved clients. Various embodiments of the present invention shall become apparent through the discussion of various figures below.

Figure 1:
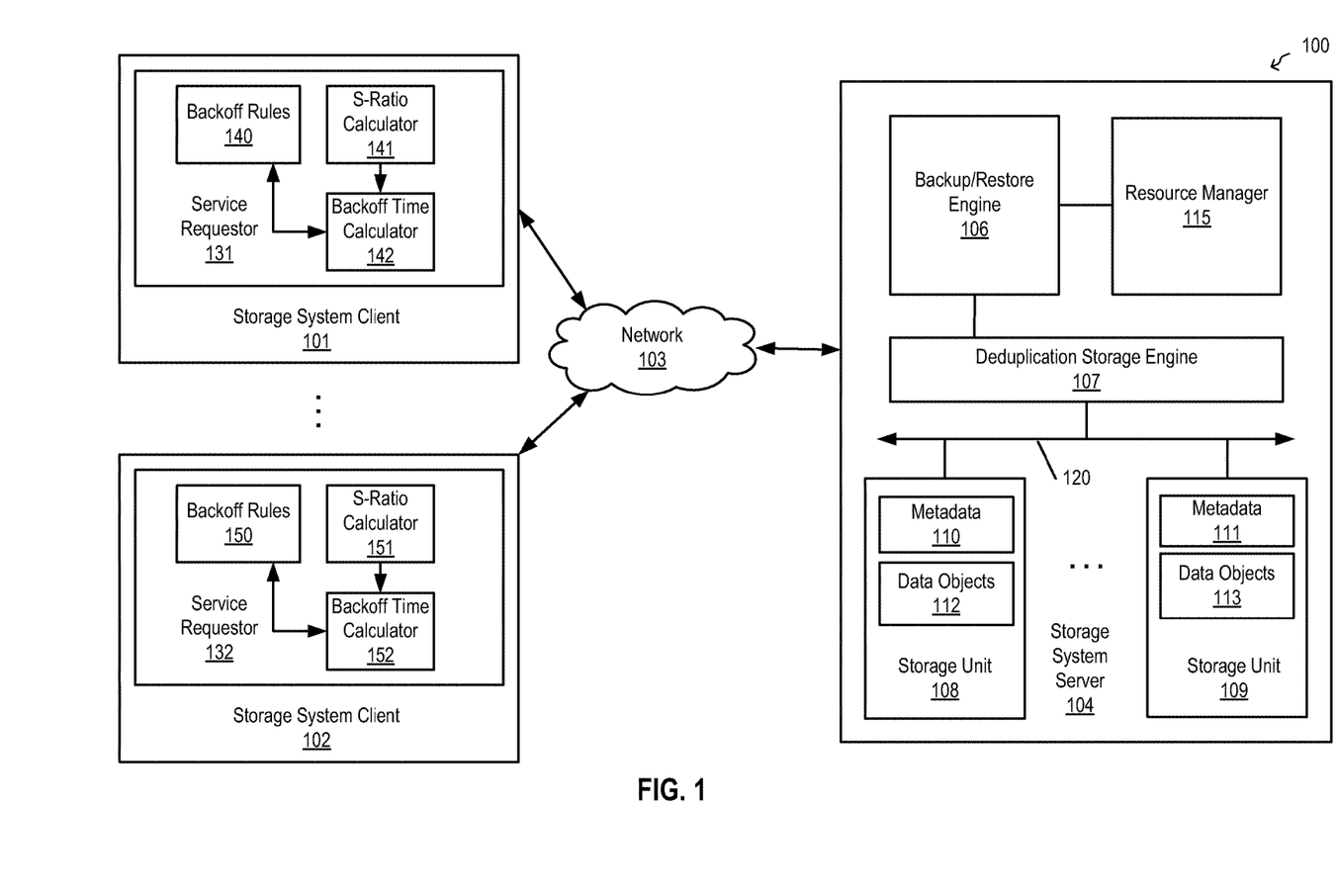
FIG. 1 is a block diagram illustrating a storage system according to one embodiment.

FIG. 1 is a block diagram illustrating a storage system according to one embodiment of the invention. Referring to FIG. 1, system 100 includes, but is not limited to, one or more client systems (which may be interchangeably referred to as clients) 101-102 communicatively coupled to storage system server (which may be interchangeably referred to as server) 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup/restore engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be a combination of such devices. In the case of disk storage media, the storage units 108-109 may be organized into one or more volumes of Redundant Array of Inexpensive Disks (RAID).

In response to a data file to be stored in storage units 108-109, deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a compression region (CR) of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

According to one embodiment, backup/restore engine 106 is responsible for backing up data from remote clients (e.g., clients 101-102) to one or more local storage units (e.g., storage units 108-109). Backup/restore engine 106 is also responsible for restoring data from one or more local storage units to the remote clients. Backup/restore engine 106 may also be configured to perform any other services, including, for example, data replication, migration, etc. Typically, a service (whether it be a backup, replication, migration, etc.) requires resources (e.g., streams, etc.) Server 104 cannot grant a service to clients 101-102 unless the required resources are available. In one embodiment, server 104 includes resource manager 115 for managing resources and performing operations that allow resources to be fairly distributed among clients 101-102.

According to one embodiment, resource manager 115 sends backoff rules to clients 101-102 which are stored as backoff rules 140 and 150, respectively. The backoff rules include, but are not limited to, backoff times and corresponding s-ratio ranges. For example, the backoff rules may indicate that the backoff time should be: 2 minutes if the s-ratio is within the range of 0-25%; 5 minutes if the s-ratio is within the range of 26-50%; 11 minutes if the s-ratio is within the range of 51-75%; and 17 minutes if the s-ratio is within the range of 76-100%. It is to be appreciated that these values are presented here for illustrative purposes, and not intended to be limitations of the present invention.

According to one embodiment, client 101 includes s-ratio calculator 141 for dynamically determining its s-ratio by calculating the ratio of the amount of resources that client 101 has been granted and the amount of resources that it needs. The amount of resources needed can be determined by service requestor 131 based on the service(s) it needs to perform. Alternatively, the amount of resources needed can be configured by a system administrator. S-ratio calculator 141 may dynamically determine its s-ratio whenever its granted resources and/or its needed resources have changed. Alternatively, or in addition to, s-ratio calculator 141 may be configured to determine its s-ratio when it needs to send a service request to server 104. Alternatively, or in addition to, s-ratio calculator 141 may be configured to determine its s-ratio whenever a backoff request is received from server 104.

The s-ratio defines how "satisfied" a client is, which can defined/represented in numerous ways. For example, if the requested service is replication, the s-ratio may be defined in terms of streams. In such an example, client 101 may need a target number of streams for performing replication. S-ratio calculator 141 may, in such an example, determine its s-ratio based on the ratio of the number of streams that it has been granted and the number of streams it needs. The s-ratio may, however, be defined in other terms. By way of further example, in the case of replication, the s-ratio may also be determined based on the ratio of the amount of data that has been replicated and the amount of data that client 101 needs to replicate. Thus, it should be understood that the s-ratio can be determined using any mechanism which defines how "satisfied" a client is, whether it be in terms of how much resources it has been allocated, or how much of its target/goal has been accomplished.

In one embodiment, service requestor 131 is to send service requests to server 104. In one embodiment, these service requests include the current s-ratio of client 101. In response to receiving the service request, resource manager 115 determines whether the resources required to perform the requested service are available. In response to determining the resources are available, resource manager 115 grants the request, and updates its resource information to account for the resources that have been allocated to client 101.

In one embodiment, in response to determining the required resources are not available, resource manager 115 denies the request by sending a denial message (e.g., an RPC message) or rejection to client 101. In one embodiment, resource manager 115 includes information in the denial message (e.g., by setting a predetermined bit in the denial message to a predetermined value) indicating a request for client 101 to perform backoff.

According to one embodiment, in response to receiving the backoff request, backoff time calculator 142 of client 101 determines a backoff time by using its current s-ratio to lookup backoff rules 140. Service requestor 131 then performs a backoff using the determined backoff time. Once the backoff is completed, service requestor 131 resends its service request. It is to be noted that service requestor 131 may have multiple pending service requests. However, in one embodiment, once service requestor 131 receives a backoff request, it suspends all pending service requests until the backoff is completed. Here, "suspending all pending requests" refers to not sending any service requests to server 104 even though the pending service requests have not been explicitly denied by server 104. By way of example, suppose client 101 has two service requests, and sends out the first service request to server 104. In response, server 104 denies the first service request and requests client 101 to perform a backoff. In response to this backoff request, client 101 suspends its pending second service request even though the second service request has not been explicitly denied by server 104. In this way, server 104 is not overwhelmed with service requests that it cannot grant.

According to one embodiment, resource manager 115 is configured to request client 101 and/or client 102 to relinquish resources under certain conditions. In one such embodiment, resource manager 115, in response to receiving a request from a client, determines whether the client is starved of resources (e.g., by determining whether its s-ratio is below the starved s-ratio). In response to determining the requesting client is starved, resource manager 115 updates local information (e.g., by setting a starved bit to a predetermined value) to indicate that at least one client is starved of resources.

Subsequently, in response to receiving another service request, resource manager 115 determines whether: 1) there is at least one starved client, 2) the requesting client reported an s-ratio that is higher than the rich s-ratio, and 3) the amount of available resources required to perform the requested service is below a predetermined resource threshold. In response to determining all three conditions are met, resource manager 115 causes server 104 to send a request to the client requesting it to relinquish some resources. Here, the request to relinquish resources can be included in the same denial message that is sent to the client, or a different message.

In response to receiving the request to relinquish resources, the client relinquishes or releases a predetermined amount of resources, for example, by terminating a predetermined number of services. According to one embodiment, in response to determining that a service request has not been received from a starved client in a predetermined time period (e.g., the last 5 minutes), resource manager 115 updates its local information (e.g., by resetting the starved bit to a predetermined value) to indicate that there are no starved clients. It should be noted here that the starved s-ratio is configured with a value that is lower than the rich s-ratio.

Client 102 includes service requestor 132 which performs operations similar to those performed by service requestor 131. For example, backoff rules 150, s-ratio calculator 151, and backoff time calculator 152 perform functions that are similar to those performed by backoff rules 140, s-ratio calculator 141, and backoff time calculator 142, respectively. For the sake of brevity, service requestor 132 will not be described.

Throughout the description, the s-ratio and the backoff time are described as being calculated by clients 101-102. It is to be appreciated, however, that the operations performed by backoff time calculators 142 and 152 and/or the operations performed by s-ratio calculators 141 and 151 can be performed by server 104. For example, the backoff time may be calculated by server 104 and sent to the client as part of a denial message. In such an embodiment, server 104 is to maintain backoff rules similar to backoff rules 140 and 150, and determines, for example, the backoff time for a client based on the s-ratio included as part of the service request or calculated by server 104.

Throughout the description, embodiments of the present invention are described in the context of storage system clients and servers. It is to be appreciated that the present invention is not so limited. For example, the resource allocation mechanisms described herein can be equally applied to any client-server architecture where the client requires resources to be allocated by the server.

Figure 2:
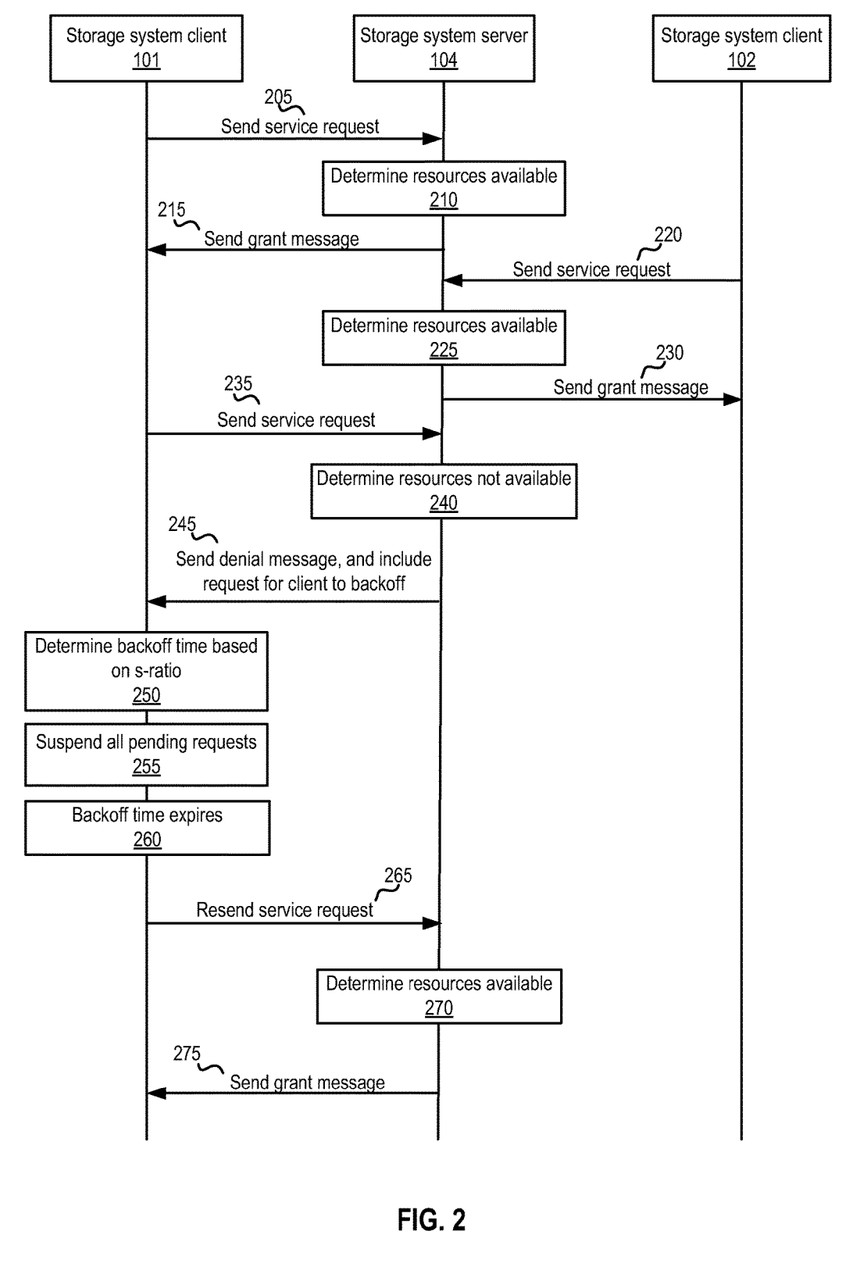
FIG. 2 is a transaction diagram illustrating transactions for distributing resources fairly according to one embodiment.

FIG. 2 is a transaction diagram illustrating transactions for distributing resources fairly, according to one embodiment. At transaction 205, client 101 sends a service request to server 104. At transaction 210, server 104 determines that the resources required to perform the requested service is available. At transaction 215, server 104 grants the request by sending a grant message to client 101. Server 104 updates its resource availability information to account for the allocated resources.

At transaction 220, client 102 sends a service request to server 104. At transaction 225, server 104 determines that the resources required to perform the requested service is available. At transaction 230, server 104 grants the request by sending a grant message to client 102. Server 104 updates its resource availability information to account for the allocated resources.

At transaction 235, client 101 sends a service request to server 104. At transaction 240, server 104 determines that the resources required to perform the requested service is not available. At transaction 245, server 104 denies the request by sending a denial message to client 101. The denial message includes information requesting client 101 to perform a backoff.

At transaction 250, in response to receiving the request to perform backoff, client 101 dynamically calculates the s-ratio at that point in time and determines a backoff time based on its newly calculated s-ratio. For example, backoff time calculator 142 uses the s-ratio calculated by s-ratio calculator 141 to look up backoff rules 104 to determine the backoff time. At transaction 255, client 101 suspends some or all pending service requests, for example, for at least a period of time that is indicated by the determined backoff time. For example, even though another pending service request has not been sent to server 104, and thus, has not been explicitly denied by server 104, client 101 suspends the pending service request in order to avoid overwhelming server 104 with service requests that server 104 cannot grant.

At transaction 260, client 101 completes its backoff. At transaction 265, client 101 resends its service request. At transaction 270, server 104 determines that the resources required to perform the requested service is available (e.g., because client 102 has relinquished some resources (not shown)). At transaction 275, server 104 grants the request by sending a grant message to client 101. Server 104 updates its resource availability information to account for the allocated resources.

Figure 3:
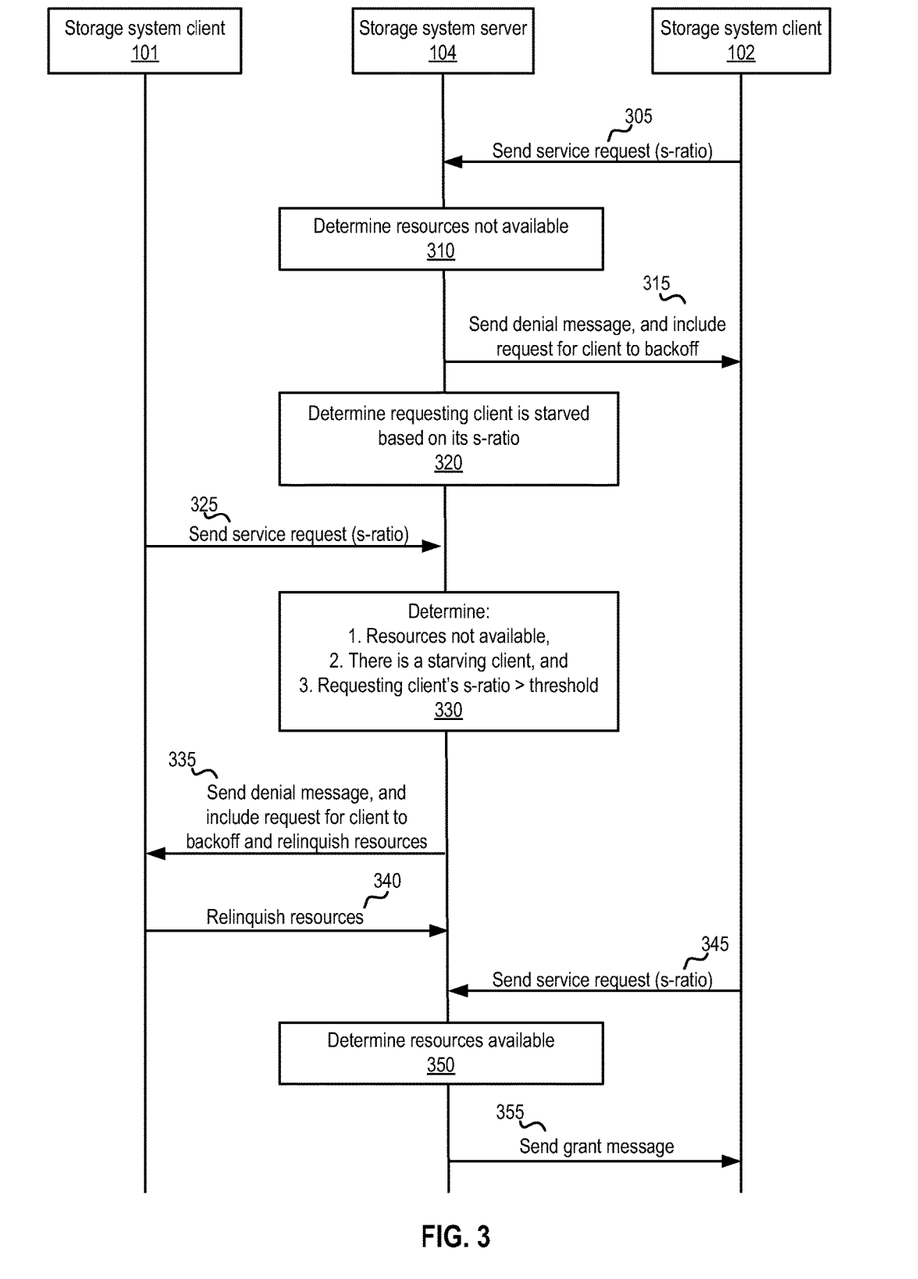
FIG. 3 is a transaction diagram illustrating transactions for distributing resources fairly according to one embodiment.

FIG. 3 is a transaction diagram illustrating transactions for distributing resources fairly, according to one embodiment. At transaction 305, client 102 sends a service request that includes its s-ratio to server 104. At transaction 310, server 104 determines that the resources required to perform the requested service is not available. At transaction 315, server 104 denies the request by sending a denial message to client 102. The denial message includes information requesting client 102 to perform a backoff.

At transaction 320, server 104 determines client 102 is starved of resources based on its s-ratio, for example, by determining that its s-ratio is below the starved s-ratio. Server 104 updates information (e.g., by setting a starved bit to a predetermined value) to indicate that at least one client is starved of resources. At transaction 325, client 101 sends a service request that includes its s-ratio to server 104.

At transaction 330, server 104 determines that 1) resources required to perform the requested service is not available, 2) there is at least one starving client, and 3) client 101's s-ratio is greater than a predetermined threshold (e.g., the rich s-ratio). At transaction 335, server 104 denies the request by sending a denial message to client 101. The denial message includes information requesting client 101 to perform a backoff and to relinquish some resources.

At transaction 340, client 101 relinquishes a predetermined amount of resources by terminating a predetermined number of services. At transaction 345, client 102 completes its backoff and resends the service request that includes its s-ratio. At transaction 350, server 104 determines that the resources required to perform the requested service is available. At transaction 355, server 104 grants the request by sending a grant message to client 102.

Figure 4:
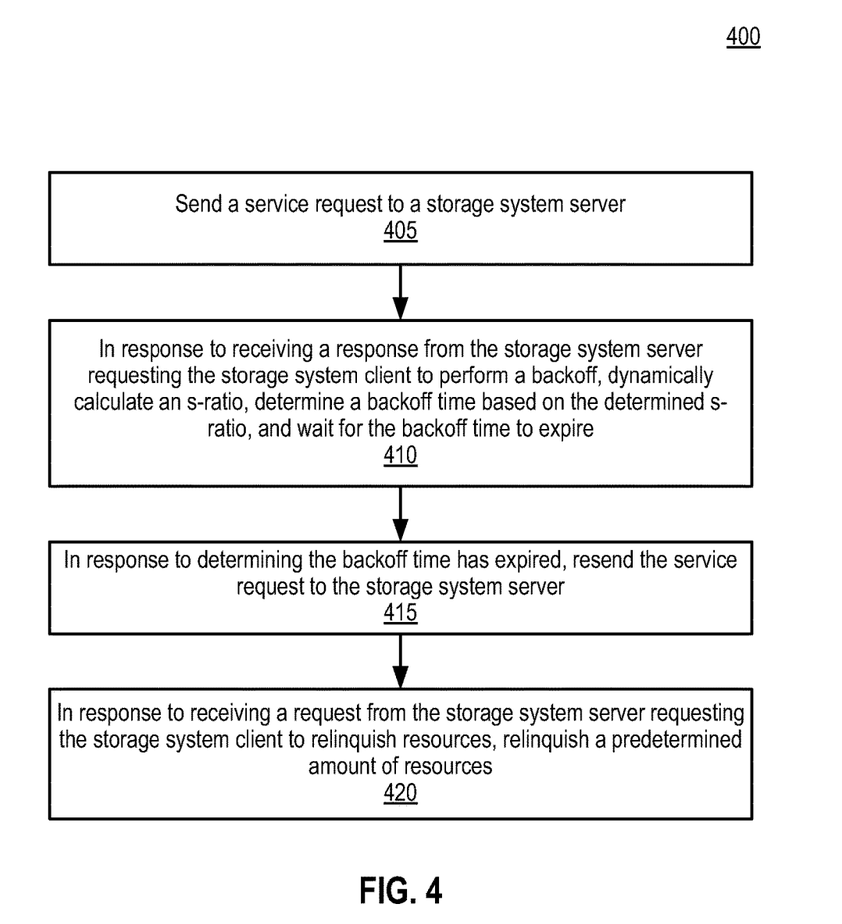
FIG. 4 is a flow diagram illustrating a method for distributing resources fairly according to one embodiment.

FIG. 4 is a flow diagram illustrating 400 for distributing resources fairly according to one embodiment. For example, method 400 can be performed by a storage system client, such as clients 101-102. Method 400 can be implemented in software, firmware, hardware, or any combination thereof. Referring now to FIG. 4, at block 405, a storage system client sends a service request to a storage system server (e.g., as part of transaction 235). At block 410, in response to receiving a response from the storage system server requesting the storage system client to perform a backoff, the storage system client dynamically calculates an s-ratio, determines a backoff time based on the s-ratio (e.g., as part of transaction 250), and waits for the backoff time to expire.

At block 415, in response to determining the backoff time has expired/elapsed (e.g., as part of transaction 260), the storage system client resends the service request to the storage system server (e.g., as part of transaction 265). At block 420, in response to receiving a request from the storage system server requesting the storage system client to relinquish resources (e.g., as part of transaction 335), the storage system client relinquishes a predetermined amount of resources (e.g., as part of transaction 340).

Figure 5:
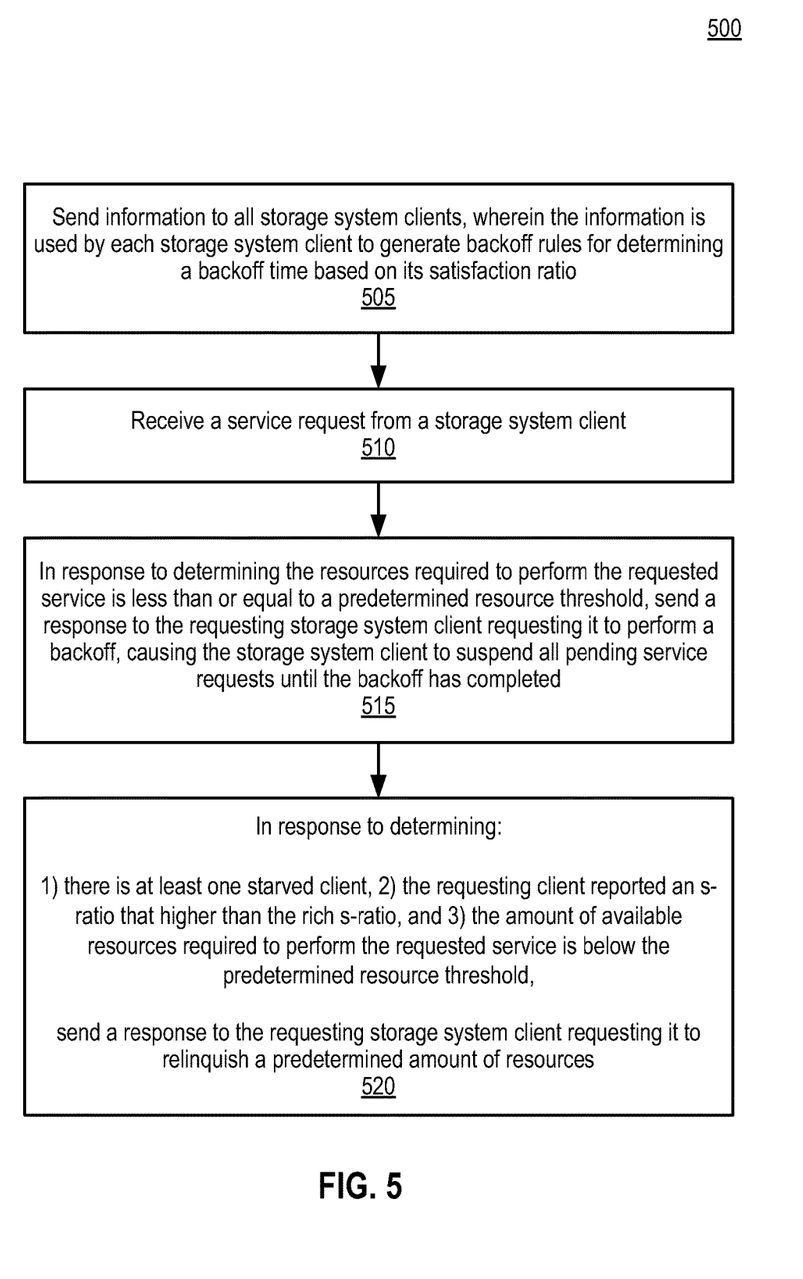
FIG. 5 is a flow diagram illustrating a method for distributing resources fairly according to one embodiment.

FIG. 5 is a flow diagram illustrating 500 for distributing resources fairly according to one embodiment. For example, method 500 can be performed by a storage system server, such as server 104. Method 500 can be implemented in software, firmware, hardware, or any combination thereof. Referring now to FIG. 5, at block 505 a storage system server sends backoff rules to all storage system clients, and each client stores the backoff rules in a storage device accessible by the respective client, and used by each storage system client to determine a backoff time based on its s-ratio. For example, the backoff rules include, but are not limited to, backoff times and corresponding s-ratio ranges. At block 510, the storage system server receives a service request from a storage system client (e.g., as part of transaction 305).

At block 515, in response to determining the resources required to perform the requested service is less than or equal to a predetermined resource threshold (e.g., as part of transaction 310), the storage system server sends a response to the requesting storage system client requesting it to perform backoff (e.g., as part of transaction 315), causing the storage system client to suspend all pending service requests until the backoff has completed.

At block 520, in response to determining 1) there is at least one starved storage system client, 2) the requesting storage system client reported an s-ratio that is higher than the rich s-ratio, and 3) the amount of available resources required to perform the requested service is below the predetermined resource threshold, the storage system server sends a request to the requesting storage system client requesting it to relinquish a predetermined amount of resources (e.g., as part of transaction 335).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method at a storage system client, the method comprising:
   sending a service request to a storage system server;
   in response to receiving a response and backoff rules from the storage system server, the response requesting the storage system client to perform a backoff,
   dynamically calculating a satisfaction ratio (s-ratio) by determining a ratio of an amount of resources that have been granted to the storage system client and an amount of resources that are needed by the storage system client,
   using the backoff rules to determine a backoff time based on the s-ratio, wherein the backoff rules include a backoff time and a corresponding s-ratio range, and
   waiting for the backoff time to expire; and
   in response to determining the backoff time has expired, resending the service request to the storage system server.

2. The method of claim 1, wherein the service request is replication, and
   wherein the s-ratio is calculated by determining a ratio of a number of streams that has been granted to the storage system client and a number of streams that is needed by the storage system client.

3. The method of claim 1, further comprising in response to receiving the response from the storage system server requesting the storage system client to perform the backoff, suspending all pending service requests until the backoff time has expired.

4. The method of claim 1, wherein determining the backoff time based on the s-ratio comprises using the s-ratio to index a data structure, wherein the data structure is generated based on information received from the storage system server.

5. The method of claim 1, wherein the service request requests a service that requires resources, wherein the required resources are streams.

6. The method of claim 1, wherein the storage system server sends the response requesting the storage system client to perform the backoff in response to determining an amount of available resources required to perform the requested service is less than or equal to a predetermined resource threshold.

7. The method of claim 1, further comprising:
   in response to receiving a request from the storage system server requesting the storage system client to relinquish resources, relinquishing a predetermined amount of resources.

8. A non-transitory computer-readable storage medium having computer code stored therein, which when executed by a processor at a storage system client, cause the storage system client to perform operations comprising:
   sending a service request to a storage system server;
   in response to receiving a response and backoff rules from the storage system server, the response requesting the storage system client to perform a backoff,
   dynamically calculating a satisfaction ratio (s-ratio) by determining a ratio of an amount of resources that have been granted to the storage system client and an amount of resources that are needed by the storage system client,
   using the backoff rules to determine a backoff time based on the s-ratio, wherein the backoff rules include a backoff time and a corresponding s-ratio range, and
   waiting for the backoff time to expire; and
   in response to determining the backoff time has expired, resending the service request to the storage system server.

9. The non-transitory computer-readable storage medium of claim 8, wherein the service request is replication, and
   wherein the s-ratio is calculated by determining a ratio of a number of streams that has been granted to the storage system client and a number of streams that is needed by the storage system client.

10. The non-transitory computer-readable storage medium of claim 8, further comprising in response to receiving the response from the storage system server requesting the storage system client to perform the backoff, suspending all pending service requests until the backoff time has expired.

11. The non-transitory computer-readable storage medium of claim 8, wherein determining the backoff time based on the s-ratio comprises using the s-ratio to index a data structure, wherein the data structure is generated based on information received from the storage system server.

12. The non-transitory computer-readable storage medium of claim 8, wherein the service request requests a service that requires resources, wherein the required resources are streams.

13. The non-transitory computer-readable storage medium of claim 8, wherein the storage system server sends the response requesting the storage system client to perform the backoff in response to determining an amount of available resources required to perform the requested service is less than or equal to a predetermined resource threshold.

14. The non-transitory computer-readable storage medium of claim 8, further comprising:
   in response to receiving a request from the storage system server requesting the storage system client to relinquish resources, relinquishing a predetermined amount of resources.

15. A storage system client, comprising:
   a set of one or more processors; and
   a non-transitory machine-readable storage medium containing code, which when executed by the set of one or more processors, cause the storage system client to
   send a service request to a storage system server;
   in response to receiving a response and backoff rules from the storage system server, the response requesting the storage system client to perform a backoff,
   dynamically calculate a satisfaction ratio (s-ratio) by determining a ratio of an amount of resources that have been granted to the storage system client and an amount of resources that are needed by the storage system client,
   use the backoff rules to determine a backoff time based on the s-ratio, wherein the backoff rules include a backoff time and a corresponding s-ratio range, and
   wait for the backoff time to expire; and
   in response to determining the backoff time has expired, resend the service request to the storage system server.

16. The storage system client of claim 15, wherein the service request is replication, and
   wherein the s-ratio is calculated by determining a ratio of a number of streams that has been granted to the storage system client and a number of streams that is needed by the storage system client.

17. The storage system client of claim 15, further comprising:
   in response to receiving the response from the storage system server requesting the storage system client to perform the backoff, the storage system client is to suspend all pending service requests until the backoff time has expired.

18. The storage system client of claim 15, wherein determining the backoff time based on the s-ratio comprises the storage system client to use the s-ratio to index a data structure, wherein the data structure is generated based on information received from the storage system server.

19. The storage system client of claim 15, wherein the service request requests a service that requires resources, wherein the required resources are streams.

20. The storage system client of claim 15, wherein the storage system server sends the response requesting the storage system client to perform the backoff in response to determining an amount of available resources required to perform the requested service is less than or equal to a predetermined resource threshold.

21. The storage system client of claim 15, further comprising:
   in response to receiving a request from the storage system server requesting the storage system client to relinquish resources, the storage system client is to relinquish a predetermined amount of resources.

* * * * *